(12) United States Patent
Shrivastava et al.

(10) Patent No.: US 11,475,276 B1
(45) Date of Patent: Oct. 18, 2022

(54) GENERATING MORE REALISTIC SYNTHETIC DATA WITH ADVERSARIAL NETS

(71) Applicant: Apple Inc., Cupertino, CA (US)

(72) Inventors: Ashish Shrivastava, Sunnyvale, CA (US); Tomas J. Pfister, Foster City, CA (US); Cuneyt O. Tuzel, Santa Clara, CA (US); Russell Y. Webb, San Jose, CA (US); Joshua Matthew Susskind, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1315 days.

(21) Appl. No.: 15/804,900

(22) Filed: Nov. 6, 2017

Related U.S. Application Data

(60) Provisional application No. 62/418,635, filed on Nov. 7, 2016.

(51) Int. Cl.
*G06N 3/04* (2006.01)
*G06N 3/08* (2006.01)
*G06K 9/62* (2022.01)

(52) U.S. Cl.
CPC ............ *G06N 3/0454* (2013.01); *G06N 3/08* (2013.01); *G06K 9/6255* (2013.01); *G06K 9/6262* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 9,785,855 B2 | 10/2017 | Gordo Soldevila et al. |
| 2005/0232512 A1 | 10/2005 | Luk et al. |
| 2014/0279770 A1 | 9/2014 | Xaypanya et al. |
| 2015/0254555 A1 | 3/2015 | Williams et al. |

OTHER PUBLICATIONS

Xi Chen, et al., "InfoGAN: Interpretable Representation Learning by Information Maximizing Generative Adversarial Nets", arXiv preprint arXiv:1606.03657, 2016, pp. 1-9.
Gregory Shakhnarovich, et al., "Fast Pose Estimation with Parameter Sensitive Hashing", Proc CVPR, 2015, pp. 1-8.
(Continued)

*Primary Examiner* — Evren Seven
(74) *Attorney, Agent, or Firm* — Robert C. Kowert; Kowert, Hood, Munyon, Rankin & Goetzel, P.C.

(57) ABSTRACT

A generative network may be learned in an adversarial setting with a goal of modifying synthetic data such that a discriminative network may not be able to reliably tell the difference between refined synthetic data and real data. The generative network and discriminative network may work together to learn how to produce more realistic synthetic data with reduced computational cost. The generative network may iteratively learn a function that synthetic data with a goal of generating refined synthetic data that is more difficult for the discriminative network to differentiate from real data, while the discriminative network may be configured to iteratively learn a function that classifies data as either synthetic or real. Over multiple iterations, the generative network may learn to refine the synthetic data to produce refined synthetic data on which other machine learning models may be trained.

20 Claims, 12 Drawing Sheets

(56) References Cited

OTHER PUBLICATIONS

Yaroslav Ganin, et al., "Unsupervised Domain Adaptation by Backpropagation", arXiv preprint arXiv:1409.7495, 2014, pp. 1-11.

Jan J. Goodfellow, et al., "Generative Adversarial Nets", In Proc. NIPS, 2014, pp. 1-9.

Ankush Gupta, et al., "Synthetic Data for Text Localisation in Natural Images", Proc CVPR, 2016, pp. 1-14.

Saurabh Gupta, et al., "Learning Rich Features from RGB-D Images for Object Detection and Segmentation", In Proc. ECCV, 2014, pp. 1-16.

Ankur Handa, et al., "SceneNet: Understanding Real World Indoor Scenes With Synthetic Data", In Proc CVPR, 2015, pp. 1-12.

Kaiming He, et al., "Deep Residual Learning for Image Recognition", arXiv:1512.03385v1 [cs.CV], Dec. 10, 2015, pp. 1-12.

Sergey Ioffe, et al., "Batch Normalization: Accelerating Deep Network Training by Reducing Internal Covariate Shift", Proceedings of the 32nd International Conference on Machine Learning, JMLR: W&CP, vol. 37, Copyright 2015 by the authors), pp. 1-9.

Catalin Ionescu, et al., "Human3.6M: Large Scale Datasets and Predictive Methods for 3D Human Sensing in Natural Environments", IEEE Transactions on Pattern Analysis and Machine Learning Intelligence, 2014, pp. 1-15.

Max Jaderberg, et al., "Reading Text in the Wild with Convolutional Neural Networks", Int J Comput Vis, 116(1):1-20, Springer, 2016, pp. 1-20.

Yann Lecun, et al., "Learning Methods for Generic Object Recognition with Invariance to Pose and Lighting", In Proc. CVPR, 2004, pp. 1-8.

Ming-Yu Liu, et al., "Coupled Generative Adversarial Networks", 30th Conference on Neural Information Processing Systems (NIPS 2016), 2016, pp. 1-9.

Vinod Nair, et al., "Analysis-by Synthesis by Learning to Invert Generative Black Boxes", Proceedings of the 18th International Conference on Artificial Neural Networks, 2008, pp. 971-981.

Alejandro Newell, et al., "Stacked Hourglass Networks for Human Pose Estimation", arXiv:1603.06937v2 [cs.CV], Jul. 26, 2016, pp. 1-17.

Dennis Park, et al, "Articulated pose estimation with tiny synthetic videos", In Proc. CVPR, 2015, pp. 1-9.

Xingchao Peng, et al., "Learning Deep Object Detectors from 3D Models", In Proc. ICCV, 2015, pp. 1-9.

Leonid Pishchulin, et al, "Articulated People Detection and Pose Estimation: Reshaping the Future", Proceedings of the IEEE Conference on Computer Vision and Pattern Recognition (CVPR), Jun. 2012. pp. 1-8.

Gregoy Rogez, et al., "MoCap-guided Data Augmentation for 3D Pose Estimation in the Wild", arXiv:1607.02046v1 [cs.CV], Jul. 7, 2016, pp. 1-10.

Tim Salimans, et al., "Improved Techniques for Training GANs", arXiv:1606.03498v1 [cs.LG], Jun. 10, 2016, pp. 1-10.

Jamie Shotton, et al., "Efficient Human Pose Estimation from Single Depth Images", Trans. Pami, Submitted for Review, 2012, pp. 1-21.

James Steven Supancic III, et al., "Depth-based hand pose estimation: methods, data, and challenges", arXiv:1504.06378v2 [cs.CV], May 6, 2015, pp. 1-15.

Jonathan Tompson, et al., "Real-Time Continuous Pose Recovery of Human Hands Using Convolutional Networks", Preprint ACM Transactions on Graphics, 2014, pp. 1-10.

Oncel Tuzel, et al., "Global-Local Face Upsampling Network", arXiv:1603.07235v2 [cs.CV], Apr. 27, 2016, pp. 1-23.

Aaron Van Den Oord, et al., "Pixel Recurrent Neural Networks", Proceedings of the 33rd International Conference on Machine Learing, arXiv:1601.06759v3 [cs.CV], Aug. 19, 2016. pp. 1-11.

Zhangyang Wang, et al., "DeepFont: Identify Your Font from An Image", ACM, MM'15, Oct. 26-30, 2015, pp. 1-9.

Xi Zhang, et al., "Learning Classifiers from Synthetic Data Using a Multichannel Autoendcoder", arXiv:1503.03163v1 [cs.CV], Mar. 11, 2015, pp. 1-11.

Jeff Michels, et al., "High Speed Obstacle Avoidance using Monocular Vision and Reinforcement Learning", Proceeding of the 22nd International Conference on Machine Learning, 2005, pp. 1-8.

Elad Richardson, et al., "3D Face Reconstruction by Learning from Synthetic Data", arXiv:1609.04387v2 [cs.CV], Sep. 26, 2016, pp. 1-8.

GENERATING MORE REALISTIC SYNTHETIC DATA WITH ADVERSARIAL NETS

PRIORITY DATA

This application claims benefit of priority to U.S. Provisional Application Ser. No. 62/418,635, titled "Generating More Realistic Synthetic Data with Adversarial Nets", filed Nov. 7, 2016, by Ashish Shrivastave, Tomas J. Pfister, Cuneyt O. Tuzel, Russell Y. Webb and Joshua Matthew Susskind, which is hereby incorporated by reference in its entirety as though fully and completely set forth herein.

BACKGROUND

Technical Field

This disclosure relates generally to systems and algorithms for machine learning and machine learning models.

Description of the Related Art

Annotated training data can be useful when training accurate machine learning models. Collecting such data using traditional techniques may be very expensive. When training models on synthetic data, a synthesizer may be able to deform and manipulate objects to cover a large space of variations that would otherwise be expensive and/or difficult (or even impossible) to collect in the real world. Additionally, when using synthetic data, annotations may be obtained automatically. However, learning from synthetic data can be problematic, such as due to differences in feature distributions between synthetic and real data (which may be termed a "synthetic gap"). For example, models trained on less realistic synthetic data may not work as well on real (e.g., not synthetic) data.

Labeled training datasets (esp., large labeled training datasets) have, in some situations, become increasingly important, such as when using high capacity deep neural networks. Thus, neural networks may be trained on synthetic data instead of real data. A number of tasks have been performed using synthetic data, such as text detection and classification in RGB images, font recognition, object detection in depth (and RGB) images, hand pose estimation in depth images, scene recognition in RGB-D, and human pose estimation in RGB images, especially prior to the use of deep learning neural networks.

However, learning from synthetic data can be problematic. For instance, synthetic data is often not realistic enough, possibly leading the network to learn details only present in synthetic data and to fail to generalize well with the real (e.g., non-synthetic) data. The terms 'synthetic' and 'real' are used herein merely to differentiate artificially (e.g., synthetically) generated data from data captured from the "real" world. One potential solution to closing the synthetic gap may involve improving the renderer. For instance, the use of photo-realistic renderers may help to improve synthetic data. However, increasing the realism is often computationally expensive, renderer design is frequently difficult and expensive, and renderers often fail to sufficiently model noise present in real images, thereby potentially causing neural networks to overfit to unrealistic details in the synthetic images.

SUMMARY

Described herein are methods, systems and/or techniques for providing refined synthetic data, such as for use when training machine learning models. For example, the methods, systems and/or techniques described herein may be utilized to implement a refiner network configured to provide improved realism of synthetic images, such as when used with adversarial neural networks. Additionally, a refiner network, according to some embodiments, may be configured to produce significantly more realistic data with reduced (or minimal) computational cost.

Machine learning models may be trained on synthetic data, thereby potentially avoiding a need for expensive annotations generally required when using real data. However, learning from synthetic data may not achieve the desired performance, such as due to a gap between synthetic and real data distributions. The term 'synthetic gap' may be used herein to refer to differences between synthetic data and real data. To reduce this gap, a deep neural network may be configured to refine synthetic data using unlabeled real data. For example, in some embodiments, a refiner network may learn (and/or be trained) in an adversarial setting with a goal of modifying (e.g., refining) synthetic data such that the adversarial network may not be able to reliably tell the difference between refined synthetic data and real data.

A system configured to implement one or more of the systems, methods and/or techniques described herein may include both a refiner network and an adversarial network configured to work together (e.g., such as according to a Generative Adversarial Network), according to some embodiments. The refiner network may be considered a generator or generative network and the adversarial network may be considered a discriminator or discriminative network. The generative network may be configured to iteratively learn a function that refines or improves the synthetic data with a goal of generating refined synthetic data that is more realistic (i.e., that is more difficult for the discriminative network to differentiate from real data), while the discriminative network may be configured to iteratively learn a function that identifies (e.g., classifies) data as either synthetic or real. Over multiple iterations, the generative network may learn to modify (e.g., refine) the synthetic data in order to produce refined synthetic data on which other machine learning models may be trained.

Figure 1:
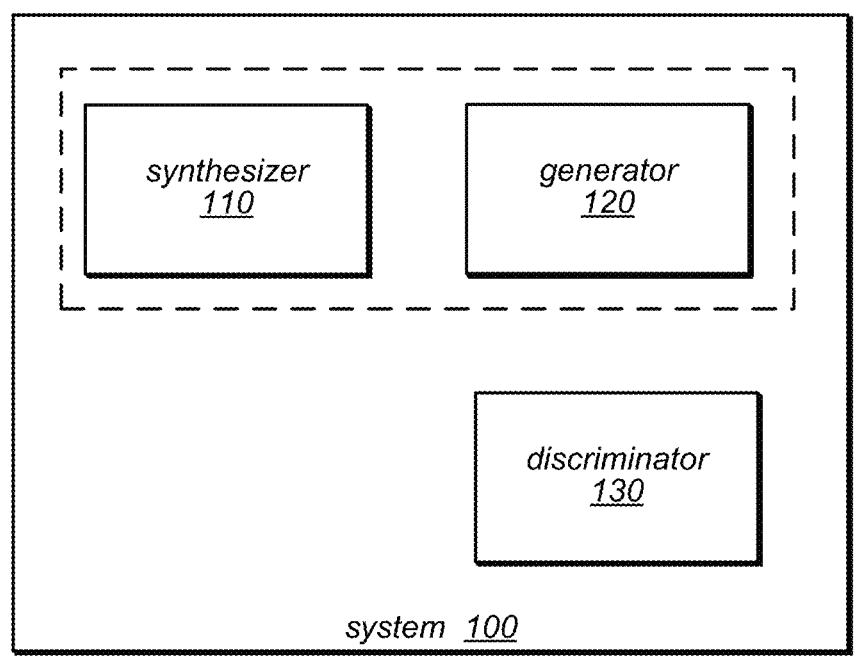
FIG. 1 is a logical block diagram illustrating a system configured to implement one or more of the systems, methods and/or techniques described herein, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." When used in the claims, the term "or" is used as an inclusive or and not as an exclusive or. For example, the phrase "at least one of x, y, or z" means any one of x, y, and z, as well as any combination thereof.

DETAILED DESCRIPTION

As noted above, a system configured to implement one or more of the systems, methods and/or techniques described herein may include both a generative network and a discriminative network (as well as possibly a synthesizer module). In some embodiments, the discriminative network may be configured to learn a function that maps the input data (e.g., synthetic data) to some desired output class label (e.g., either synthetic or real). The generative network may be configured to learn the joint probability of the input data and output labels simultaneously. Thus, the system may be considered to include two competing neural network models. One (e.g., the generative network) that takes synthetic data as input and generates refined synthetic data and one (e.g., the discriminative network) receives both refined synthetic data from the generative network and real data (e.g., from a set of training data) and learns to distinguish between the two. These two networks may be considered to play a continuous iterative game, where the generative network is learning to produce more and more realistic synthetic data while the discriminative network is learning to better distinguish generated data from real data. In some embodiments, these two networks may be trained simultaneously with the goal of generating refined synthetic data that is indistinguishable from real data. This may be achieved, in some embodiments, may backpropagating information from the discriminative network back to the generative network, allowing the generative network to adapt its parameters to produce output data that can fool the discriminative network.

In some embodiments, the techniques described herein may involve using a combination of adversarial cost and a self-regularization term that together may prevent the generator from drifting and/or introducing spurious artifacts in the refined synthetic data. In general, an adversarial cost may represent, or be based on, how well the discriminative network correctly classified a sample (e.g., a refined synthetic image, or other data).

The learning of this network may, in some embodiments, be performed in an unsupervised manner and/or without requiring any labels for the real images. Furthermore, the refiner net techniques described herein may lead to significantly more realistic synthetic images and improved performance in the final prediction task, according to some embodiments. When used herein the terms "realistic" and "more realistic" may refer to having qualities similar to a corresponding "real life" version of the data. For example, a refined synthetic image may be more realistic that the original synthetic image and thus may be appear more like a corresponding real life image than the original synthetic image. Additionally, when used herein refined synthetic data that is more realistic may refer to qualities that cause an adversarial network (e.g., one configured to classify data as either real or synthetic) to classify refined synthetic data as real data, according to various embodiments.

One approach to dealing with the synthetic gap issue may involve a generative model trained to make synthetic images more realistic, according to some embodiments. Additionally, a simulator or synthesizer in the loop of a generative model—unlike models that generate images from scratch—may allow synthetic images to be refined, such as to make them more realistic. For example, a refiner neural network (e.g., a 'refiner net') may be trained with a Generative Adversarial Network (GAN) modified as described herein. According to some embodiments, such a refiner net may be trained (or learned) by imposing a self-regularization constraint (e.g., to keep the refiner network from drifting to far from the original synthetic image). In some embodiments, a refiner net may be trained by imposing a self-regularization constraint even for datasets without any labels for real images (e.g., datasets including only the simulator output and unlabeled real data of an object).

As noted above, preparing sufficient real data (e.g., collecting, classifying, annotating, labeling, etc.) to train a machine learning model (e.g., a deep neural network) using real data, may be prohibitively time consuming and/or expensive. However, modifying synthetic data according to the methods, systems and/or techniques described herein may allow machine learning models trained on refined synthetic data to perform better than when using unmodified (e.g., not refined) synthetic data.

The methods, systems and/or techniques described herein are described in terms of, and evaluated using, multiple, diverse datasets (e.g., hand depth images and text images respectively). Additionally, the methods and techniques described herein may, in some embodiments, provide significant improvement in terms of the realism of synthetic images with reduced (or minimal) computational cost (e.g., such a system may run in real-time).

FIG. 1 is a logical block diagram illustrating a system configured to implement one or more of the systems, methods and/or techniques described herein, according to one embodiment. As illustrated in FIG. 1, a system 100 may include a synthesizer 110, a generator 120 and a discriminator 130. Thus, system 100 may be configured to implement any (or all) the systems, methods and/or techniques described herein. In some embodiments, system 100 may represent a single, physical device configured to implement synthesizer 110, generator 120 and discriminator 130. In other embodiments, system 100 may represent multiple physical devices each configured to implement one or more components of synthesizer 110, generator 120 and/or discriminator 130.

Generator 120 may be considered a generative model, generative network and/or refiner network configured to take synthetic data as input and generates refined synthetic data, while discriminator 130 may be considered a discriminative model or discriminative network configured to receive both refined synthetic data from the generative network and real data (e.g., from a set of training data) and learns to distinguish between the two. Synthesizer 110 may be considered a black box model configured to generate synthetic data (e.g., anything from random noise to well defined synthetic data approximating real data). In some embodiments, synthesizer 110 may be considered part of generator 120, while in other embodiments they may be separate. Together, generator 120 and discriminator 130 may be considered an adversarial network configured to learn a function for modifying synthetic data into more realistic refined synthetic data, as will be described in more detail below according to various embodiments.

As noted above, it is frequently more feasible to train machine learning models on (e.g., using) synthetic data, thereby potentially avoiding a need for expensive annotations or labels. However, learning from synthetic data may not achieve the desired performance due to a gap between synthetic and real data distributions which may be termed a 'synthetic gap'. To reduce this gap, a deep neural network that refines the synthetic images using unlabeled real data may be used. Thus, in some embodiments, generator 120 may include, or may be, a deep neural network configured to refine synthetic data using unlabeled real data.

In addition, in some embodiments refiner network may learn (or be trained) in an adversarial setting, such that the adversarial network cannot tell the difference between refined synthetic images and the real images. Thus, in some embodiments, discriminator 130 may include, or may be, an adversarial network configured to classify input data as either real or synthetic. In some cases, this may be similar to a Generative Adversarial Network (GAN) setting. However, as described herein, the generator network (e.g., generator 120) may take a synthetic image as input instead of random noise (as with the GAN setting).

Furthermore, it may be difficult for a generative model (e.g., like GAN) to learn the geometry of an object from random noise. In some embodiments, the techniques described herein may involve a combination of an adversarial cost and a self-regularization term that together may prevent the generator from drifting and/or introducing spurious artifacts. The learning of this network may, in some embodiments, be performed in an unsupervised manner and/or without requiring any labels for the real images.

Additionally, a machine learning model learned (or trained) using refined synthetic data (e.g., synthetic data generated according to the methods, systems and/or techniques described herein) may work better than one learned (or trained) using the original synthetic data, according to some embodiments. Thus, a simulator or synthesizer may be used to generate large (possibly infinite) amounts of labeled data to train models. Described herein are several algorithms to learn (or train) a refiner network with a dataset including both synthetic and real images using a combination of an adversarial loss or cost and a regularization term. A framework utilizing the methods, systems and/or techniques described herein may not require (or use) any correspondence between real and synthetic images to be effective.

Generator 120 may be coupled with synthesizer 110, thereby allowing synthetic data (e.g., synthetic images) to be refined, such as to make them more realistic. The resulting refined synthetic data may be used as training data (rather than real data) for other machine learning applications, such as text detection, text classification, font recognition, object detection, object classification, hand pose detection, hand pose estimation, hand pose classification, scene recognition, human pose detection, human pose estimation, and/or human pose classification, according to various embodiments.

Rather than generate images from scratch (e.g., the focus of most traditional generative models) a generative model, such as generator 120, may be coupled with a simulator or synthesizer, such as synthesizer 110, thereby allowing the refinement of synthetic data (e.g., to make them more realistic) by utilizing both a synthesizer and adversarial networks (e.g., generator 120 and discriminator 130), according to some embodiments. Synthesizer 110 may generate synthetic data in any of various ways, according to different embodiments. Synthesizer 110 may be configured to generate synthetic data based on a set of training data including labeled real images in which the labels of the real images may be sufficient to generate corresponding synthetic images (i.e., synthetic images that look very similar to corresponding real images in shape, pose and/or appearance). For example, in the case of depth images of a human hand, the position, shape and bone angles of the hand may be the same (or similar) for each pair of synthetic and real images. Additionally, in some embodiments, synthesizer 110 may be configured to generate an image from an input label vector s. Given this label vector, synthesizer 110 may generate a corresponding synthetic image, according to one embodiment.

In some embodiments, one benefit of using a synthesizer 110 may be that a large amount (e.g., up to an infinite amount) of training data may be generated without requiring any manual labelling (e.g., labelling which may be difficult, time consuming and/or expensive). To demonstrate the benefit of this kind of training data a hand pose estimator may be trained on a subset of the example real hand pose images in the hand pose training set, and the performance may be compared to networks trained with an increasing number of refined synthetic images. For instance, the real images in the example hand pose testing set may be used for testing in one example embodiment. In some embodiments, this may lead to models (e.g., systems, networks, etc.) that generalize significantly better on the real data test set (e.g., better than models that were not developed according to the methods, systems and/or techniques described herein). In some embodiments, adding a synthesizer to the loop that can generate arbitrary hand poses on demand may generate a more significant performance boost.

While is some embodiments, the methods, systems and/or techniques described herein may result in a deterministic model that produces one sample from this distribution, instead of modeling the noise distribution. In other embodiments, however, 'multiple different' versions of the 'real' images may be generated, possibly resulting in better augmentation data for training. For instance, in some embodiments, a noise variable may be injected into a convolutional neural network (ConvNet) that models this. Additionally, a deep neural network that sequentially predicts the pixels in an image along two (or more) spatial dimensions may be used to generate pixels sequentially, thus potentially allowing better control of image generation, according to some embodiments.

Figure 9A:
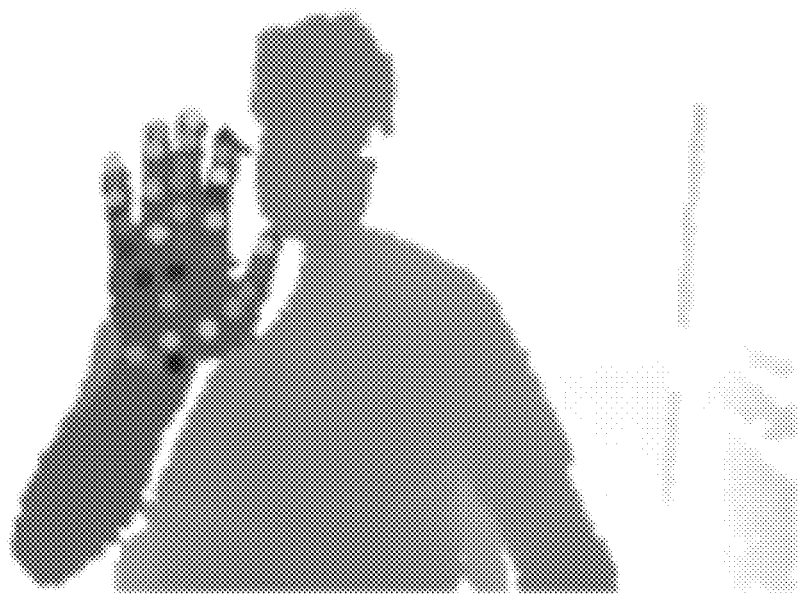
FIGS. 9A and 9B illustrates an example depth frame and corresponding synthetic image for one example hand pose dataset, according to one embodiment.
Figure 9B:
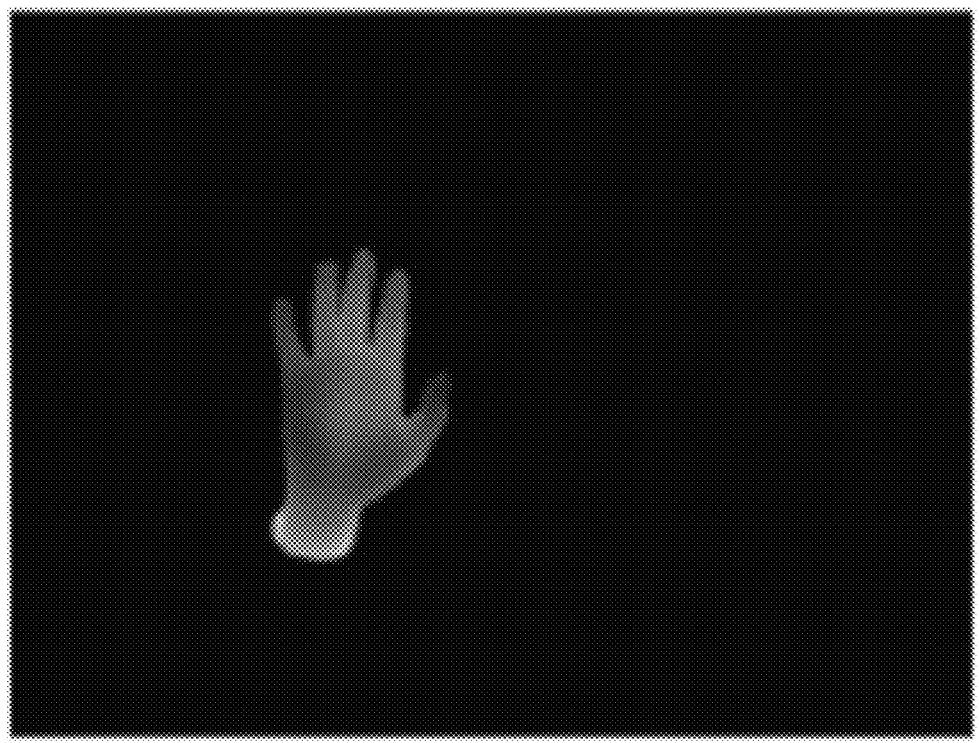

The methods, systems, and/or techniques described herein may be described in terms of, and evaluated on, various types of datasets, as described below. For instance, the methods, systems, and/or techniques described herein may be described and/or evaluated using a hand pose dataset containing training frames captured by multiple (e.g., 3) 3D motion capturing cameras (e.g., one frontal and 2 side views). For preliminary experiments, the depth frames from the frontal camera may be used. In some embodiments, each depth frame may be labeled with hand pose information used to create a synthetic depth image. For instance, FIG. 9 shows one such example frame. FIG. 9A illustrates, according to one embodiment, an example depth frame and FIG. 9B illustrates a corresponding synthetic image for the hand pose dataset. For instance, in one example embodiment, synthesizer 110 may be configured to generate synthetic hand pose images based on a hand pose dataset including training frames captured by multiple 3D motion capturing cameras (e.g., one frontal and 2 side views). For instance, in one example, the depth frames from the frontal camera may be used.

Additionally, the methods, systems, and/or techniques described herein may be described and/or evaluated using a dataset including text images with 2383 different fonts for the task of font recognition. Such a dataset may contain both labeled synthetic data and partially labeled real-world data. Moreover, the methods, systems and/or techniques described herein may also apply to other data, systems and/or situation, such as facial recognition, object recognition, etc.

Figure 2:
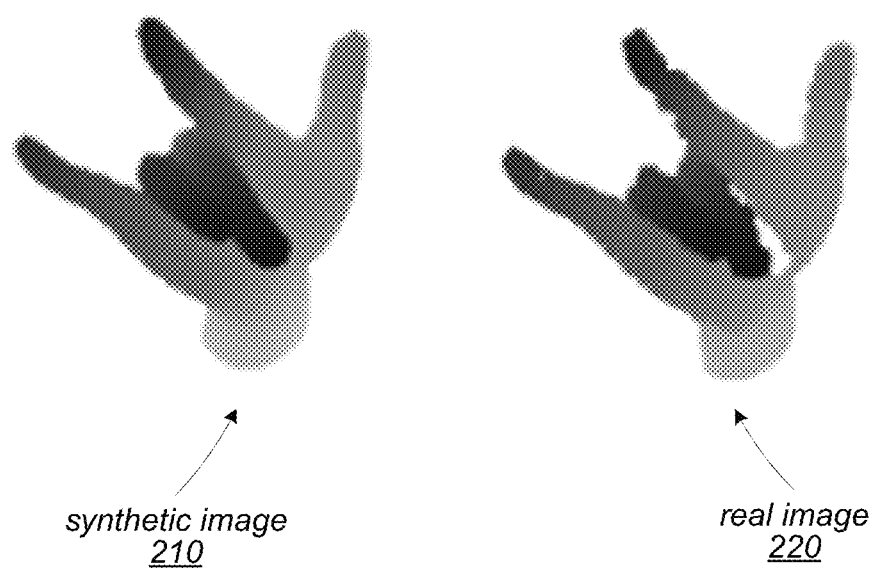
FIG. 2 illustrates a data distribution gap between a synthetic image and a corresponding real image, according to one embodiment.

In some embodiments, synthesizer 110 may be configured to label each depth frame with hand pose information to create a synthetic depth image. Synthesizer 110 may also preprocess the data in any of various ways, such as by cropping the pixels from real images using the synthetic images. In addition, in one embodiment, the images may be adjusted in various ways. For example, the images may be resized, such as to a standard size (e.g., 224×224), the background depth values may be set to zero while the foreground values may be set to the original depth value minus 2000 (i.e., assuming that the background is at 2000 millimeters). In some embodiments, there may be a noticeable data distribution gap (e.g., a synthetic gap) between synthetic and real images. For instance, sensor noise may cause a distribution shift as in the example illustrated in FIG. 2, which shows one example pair images including synthetic image 210 and real image 220 after cropping from the original image, according to one embodiment.

In some embodiments, generator 120 may include, or may be, a refiner neural network configured to modify, refine and/or improve the synthetic data produced by synthesizer 110, such as to make it more realistic. For example, in some embodiments generator 120 may be, may represent, or may include a deep filter configured to filter an image. According to some embodiments, a main objective of generator 120 may be to fool discriminator 130 such that discriminator 130 cannot tell the difference between real and synthetic data. As will be described in more detail below, generator 120 may be configured to iteratively learn a function usable to modify the synthetic data. When learning such a function, generator 120 may adjust one or more parameters (e.g., parameter of the function and/or of the refiner neural network) based on various types of feedback, such as backpropagated feedback from the discriminative neural network (e.g., discriminator 130), differences between the synthetic data and the refined synthetic data and/or differences between the refined synthetic data and the real data, according to some embodiments. Thus, generator 120 may be configured to change its parameters to make the refined synthetic data more realistic to discriminator 130. For instance, after adjusting the parameters, synthetic data that is modified by generator 120 may be more likely to be classified by discriminator 130 as real than synthetic data modified prior to adjusting the parameters, according to some embodiments.

Similarly, in some embodiments discriminator 130 may be a discriminative neural network configured to iteratively learn how to distinguish between synthetic and real data. For example, discriminator 130 may receive both synthetic data (e.g., refined synthetic data) and real data. Thus, discriminator 130 may be configured to classify input data as either synthetic or real and may further be configured to determine the difference between real and synthetic data. Information regarding discriminator 130's classification may be provided (e.g., backpropagated) to generator 120 to help generator 120 learn to better refine synthetic data.

Thus, in some embodiments, generator 120 may attempt to generate refined synthetic images that look real while discriminator 130 attempts to recognize them as synthetic— until the discriminator 130 cannot determine the refined synthetic images from real images (e.g., until discriminator 130 analyzes refined synthetic data and classifies it as real data). In some embodiments, the system may not continue learning until discriminator 130 always classifies synthetic data as real data, but may instead only attempt to refine synthetic data to within a certain tolerance of real data, based on discriminator 130's analysis and classification of the refined synthetic data.

As described above, a deep neural network (e.g., refiner network) may be used to refine synthetic data generated by a simulator (e.g., synthesizer 110), such as to make the data appear more realistic. The refined synthetic data may be used to learn various machine learning (ML) algorithms such as pose estimation, classification, etc. In general, a deep neural network (DNN) may be considered an artificial neural network (ANN) that may include multiple hidden layers between the input and output layers configured to model complex non-linear relationships. In some embodiments, a DNN architecture may generate compositional models with objects expressed layered compositions of primitives. Extra layers with the DNN may enable composition of features from lower layers, potentially modeling complex data with fewer units than a similarly performing shallow network. A refiner network as described herein may also include one or more convolutional layers, and may thus be considered a convolutional deep neural network.

In some embodiments, an adversarial network refinement process developed according to the systems, methods and/or techniques described herein may be used to develop training data for training machine learning systems. In some embodiments, this process may be performed in the background (e.g., hidden from a user of the machine learning system), while in other embodiments, it may be performed interactively. Thus, the system may be personalized for a particular person/user (e.g., such as for eye, and/or eye gaze, recognition). For example, the system could capture a few images of the user's eyes and then use a simulator to generate a large set of simulated data (e.g., synthetic eye images). Then a refiner network, as described herein, may refine the simulated data (e.g., to appear more realistic and/or more like the particular user's actual eyes) according to some embodiments. Thus, the adversarial network refinement process (e.g., the refiner network) may be interactively personalized for a particular subject (e.g., person, object, light detection and ranging signature, or other actual data, etc.) and may allow the actual machine learning model (or system) to perform better (e.g., better than if it had been trained using unrefined synthetic data), according to some embodiments.

A refiner network developed according to the systems, methods and/or techniques described herein may, in some embodiments, be considered a deep filter configured to filter an image and the adversarial network may be considered (or may actually be) a two-class classifier that takes an image (or other data) and classifies it as either real or synthetic. Thus, according to some embodiments, the adversarial network may be configured to determine the difference between real and synthetic data, while the refiner network may be configured to change its parameters to make the refined synthetic data appear more realistic to the adversarial network (e.g. such that when the adversarial network analyzes refined synthetic data, it predicts or classifies it as real data rather than synthetic).

System 100 may be implement in any of various manners, according to various embodiments. For example, in one embodiment, synthesizer 110, generator 120 and discriminator 130 may all represent software modules on a single hardware device and may communicate with each other via any of various software communication methods. In other embodiments, however, synthesizer 110, generator 120 and discriminator 130 may reside on different devices and may communicate with each other over a network or other communication media using any of various communication protocols. In another embodiment, synthesizer 110, generator 120 and discriminator 130 may all be modules of a system software program.

Please note that while described herein mainly in terms of images, the systems, methods and/or techniques described herein may be used with (or applied to) virtually any modality or data type including, but not limited to, color images, video, light detection and ranging (LiDar), speech, near-infrared images, etc. Furthermore, while described herein mainly in terms making synthetic data more realistic, the systems, methods and/or techniques described herein may be used to modify synthetic data for other results (even if the results are not more realistic). In general, the systems, methods and/or techniques described herein may be used to modify synthetic data in virtually any manner so as to cause a discriminator to be more likely to classify the refined synthetic data as any particular classification, according to various embodiments. Additionally, while discussed mainly in terms of single, static images, the methods, systems and/or techniques described herein may also be applied to videos, such as for synthesizing more realistic videos. For example, in some embodiments, a synthesis refiner-like generate model with long short term memory (LSTM) networks may be employed.

Figure 3:
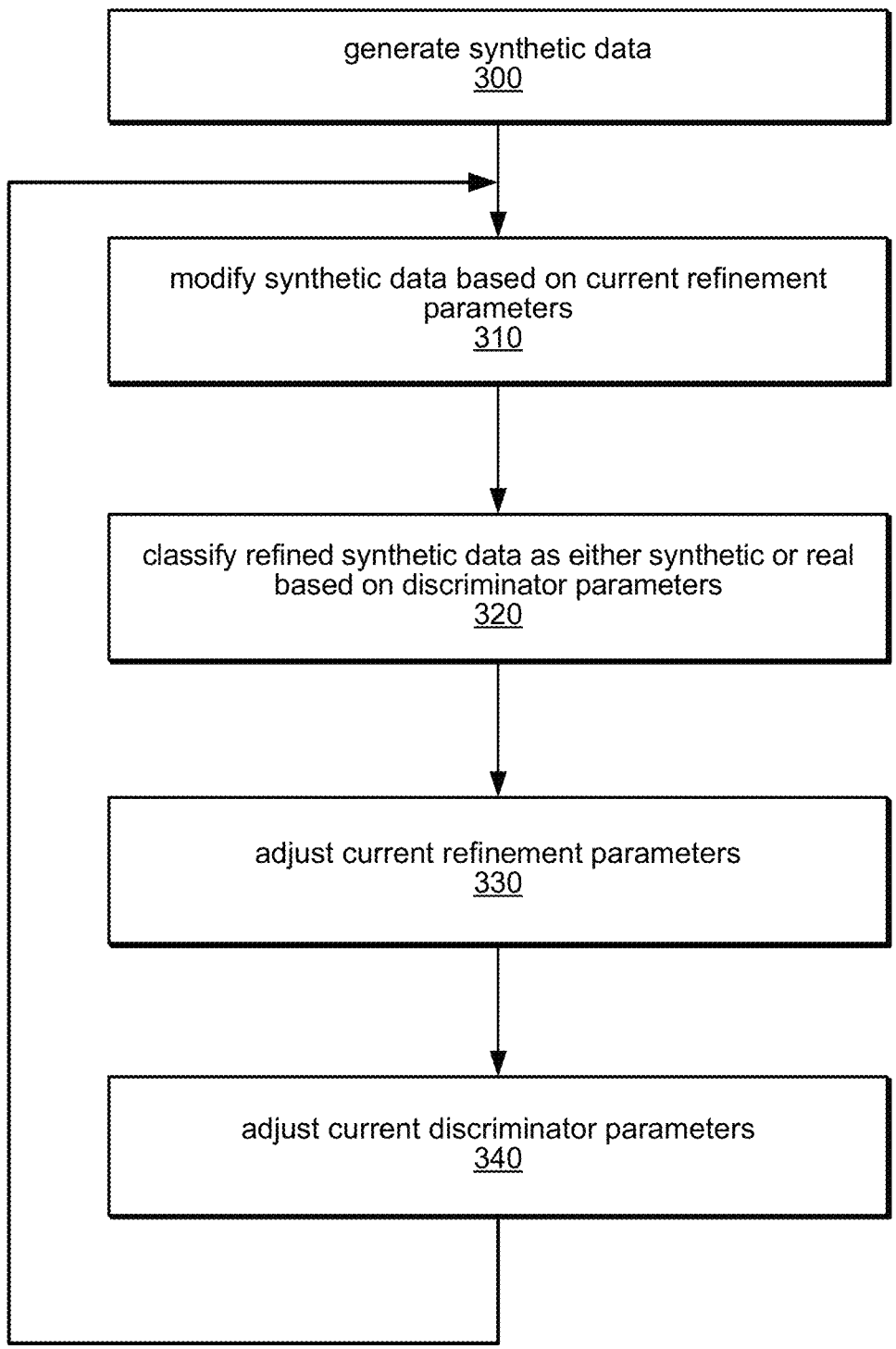
FIG. 3 is a flowchart illustrating one embodiment of method for refining synthetic data, as described herein.

FIG. 3 is a flowchart illustrating, at a high level, one embodiment of method for refining synthetic data, as described herein. As shown in block 300, a synthesizer, such as synthesizer 110 may generate synthetic data that approximates real data. For example, synthesizer 110 may be configured to generate synthetic images that are similar to, or approximate, corresponding real images. As described above, synthesizer 100 may be configured to generate synthetic data in any of various ways. For example, in one embodiment synthesizer 110 may generate synthetic images from an input label vector. The input label vector may include key attributes used to synthesize data, according to some embodiments. For example, a label may include one or more key attributes describing various arrangements and/or features of an image (or other set of data) that may be used to synthesize an image corresponding to that label (e.g., a particular hand pose, object, etc.). Given a label vector, synthesizer 110 may generate a corresponding synthetic image. For instance, the labels of a real image may help generate a corresponding synthetic image that looks very similar to, and/or approximate, a corresponding real image (e.g., in terms of position, shape, appearance, etc.).

As in block 310, generator 120 may modify the synthetic data based on current refinement parameters. For example, generator 120 may take as input a synthetic image generated by synthesizer 110 and may modify that synthetic image to generate a refined synthetic image. Generator 120 may modify synthetic data based on a current set of parameters. For example, in one embodiment generator 120 may be configured to apply a refinement function (e.g., a mathematical function) to a synthetic image using a current set of refinement parameters for the refinement function. In some embodiments, the refinement function and/or the refinement parameters may (at least partially) define a neural network of generator 120. In other embodiments, generator 120 may include one or more neural networks configured to learn the refinement function, such as in conjunction with discriminator 130.

For instance, in one embodiment, generator 120 may be configured to learn with a Generative Adversarial Network (GAN) cost as well as with a self-regularization term that together may prevent the generator from drifting and/or from introducing spurious artifacts. Using only an adversarial cost may lead to the introduction of spurious artifacts, possibly making training unstable and possibly resulting in the generation of unrealistic images. To address this, the refinement function may be regularized, such as by minimizing a combination of the adversarial cost and an image difference between synthetic images and the corresponding refined synthetic images, thus possibly discouraging the refiner network from drifting, according to some embodiments.

Furthermore, unlike in typical (and traditional) training of GAN networks, an adversarial cost may not be enforced on the whole image, but rather may be enforced on a sub-region in some embodiments. For example, the adversarial cost may be enforced only on a sub-region equivalent to the receptive field of the refiner network's final layer neurons. Since, in some embodiments, the refiner network may be fully convolutional, this may lead to the discriminator (e.g., adversarial network) learning to classify sub-regions as real vs fake. This may allow the model to learn the local noise characteristics of the real images, while at the same time avoiding the unrealistic details present in synthetic images, according to some embodiments.

Discriminator 130 may classify the refined synthetic data as either synthetic or real based at least in part on one or more discriminator parameters, as in block 320. The refined synthetic data generated by generator 120 may be provided to discriminator 130 and discriminator 130 may be configured to analyze the refined synthetic data and classify it as either real or synthetic. For instance, discriminator 130 may receive a refined synthetic image from generator 120 and may determine how well the refined synthetic image resembles a real image and based on that determination classify the input image as either real or synthetic. When classifying input data, discriminator 130 may utilize one or more neural networks configured to learn how to discriminate between synthetic and real data. Therefore, in some embodiments, discriminator 130 may utilize one or more adjustable discriminator parameters when classifying input data.

As in block 330, the current refinement parameters may be adjusted based at least in part on classification information from discriminator 130. Generator 120 may utilize one or more adjustable refinement parameters when generating refined synthetic images. For example, in one embodiment, generator 120 (or one or more neural networks of generator 120) may be configured to learn a refinement function usable to modify synthetic data. The refinement function may utilize one or more refinement parameters (e.g., as input parameters). Generator 120 may be configured to adjust one or more of the refinement parameters based at least in part on information from discriminator 130's classification process. After adjusting the refinement parameters, synthetic data that is modified by generator 120 may be more likely to be classified by discriminator 130 as real than synthetic data modified prior to adjusting the parameters, according to some embodiments. In some embodiments, adjusting refinement parameters may be similar to (or may actually be) backpropagating information through a deep neural network configured to learn how to modify synthetic data to be more realistic (i.e., in terms of a discriminator's classification as real or synthetic).

Similarly, the current discriminator parameters may be adjusted based on classification information resulting from discriminator 130's classification process, as shown in block 340. For example, the discriminator parameters may include values and/or parameters related to one or more neural networks utilized by discriminator 130 during the classification process. Thus, in some embodiments, discriminator 130 may adjust values and/or parameters related to one or more neural networks based on a previous classification process. In some embodiments, adjusting discriminator parameters may be similar to (or may actually be) back-propagating information through a deep neural network configured to learn how to classify data as either real or synthetic.

As shown by the arrow returning from block 340 to block 310, the system may work iteratively to learn how to refine synthetic data. Thus, generator 120 may modify synthetic data repeatedly using newly adjusted refinement parameters each time. In some embodiments, this process may be similar to (or may actually be) training a neural network (e.g., a deep neural network). Similarly, discriminator 130 may be configured to iteratively learn how to better classify data as synthetic or real. Discriminator 130 may repeatedly classify input data using newly adjusted discriminator parameters each time. In some embodiments, this process may be similar to (or may actually be) training a neural network (e.g., a deep neural network).

The system may continue to iterate until generator 120 learns how to refine synthetic data such that discriminator 130 cannot tell the difference between synthetic and real data. In some embodiments, the system may iterate until any difference between the refined synthetic images and the real images may be small enough as to make no significant difference in the performance of a system trained using the final refined synthetic data.

Synthetic data may be generated by synthesizer 110 and refined by generator 120, such as by using a refiner network. As noted above, the refiner network may, in some embodiments, minimize the combination of an adversarial cost and a self-regularization term. Thus, the output of synthesizer 110 may be refined with a refiner net (e.g., part of generator 120) trained and/or learned in an adversarial setting, such that the adversarial network (e.g., discriminator 130) cannot tell the difference between refined synthetic images and the real images. In other words, if a system (e.g., a machine learning system) were trained using the refined synthetic data, the resulting performance would be similar to the performance of the system if it were trained using the real data.

As noted above, generator 120 may be configured to learn a refinement function $G_\theta(x)$, where x is a set of synthetic data (e.g., a synthetic image) and $\theta$ represents the function parameters. In some embodiments, such as when using convolutional neural networks (ConvNets), $\theta$ may be considered the weights and biases of the refiner neural network. The result of the refinement function may represent a refined version 430 of the synthetic data. For example, given a synthetic image x, the refined image $\tilde{x}=G_\theta(x)$ may look like a real image in appearance—or at least more realistic than the original synthetic image. In some embodiments, a refined image may or may not actually look like a real image to a human observer, but the refined image may appear more realistic to an adversarial network. More importantly, a machine learning model may work better (e.g., perform better on a final application) when trained on the refined synthetic data than when trained on the unrefined synthetic data. For instance, the performance of a refined learning model trained on refined synthetic data may be closer to the performance of a model trained on real data than one trained on raw (unrefined) synthetic data.

Figure 4:
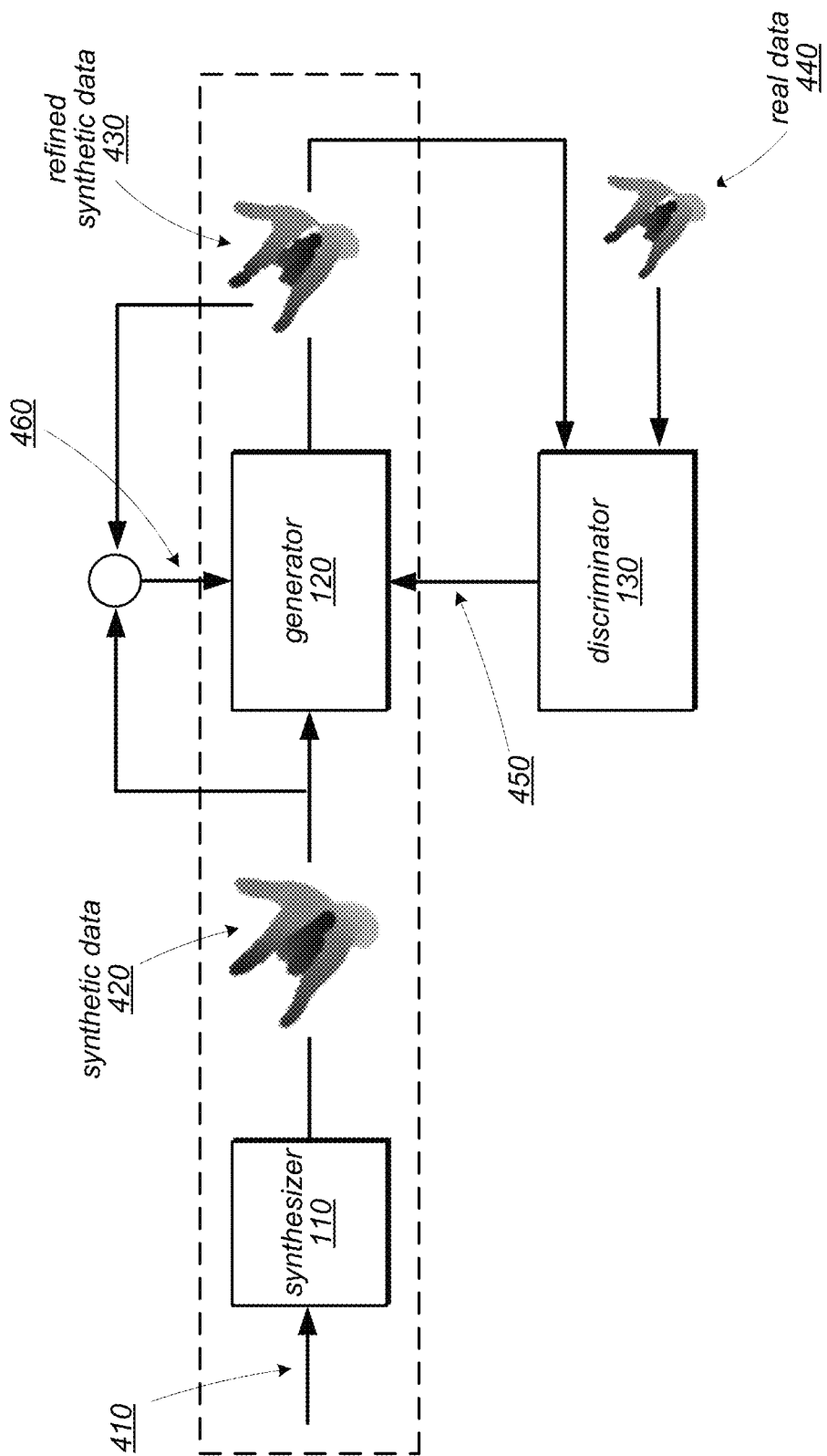
FIG. 4 is a logical block diagram illustrating data flow through a system configured to refine synthetic images where in the input may include labeled real images, according to one example embodiment.

FIG. 4 is a logical block diagram illustrating data flow through a system configured to refine synthetic images where in the input may include labeled real images, according to one example embodiment. Synthesizer 110 may utilize an input label vector 410 on which to base the generation of synthetic data 420. When a function $G_\theta(x)$ is learned using a training dataset including labeled real images 440, the labels of the real images 440 may be sufficient to generate corresponding synthetic images—i.e. synthetic images 420 may look very similar to, and/or approximate, the corresponding real images in shape, pose, and appearance, according to some embodiments. For example, in the case of depth images of a human hand, the position, shape and bone angles of the hand may be the same (or similar) for each pair of synthetic and real images.

Given pairs of synthetic and real images, generator 120 may be configured to minimize the $l_1$ or $l_2$ norm of the image difference 460 between the original synthetic image and the refined synthetic image. Image difference 460 may be based on a comparison (e.g., mathematically) of the original synthetic image and the refined synthetic image, in some embodiments. For example, generator 120 may use and iterative adjust ConvNet parameters $\hat{\theta}=\arg\min_\theta \Theta \|G_\theta(x_i) - y_i\|_1$, where $y_i$ is the real image corresponding to the synthetic image $x_i$, and $\|.\|_1$ is $l_1$ norm, according to some embodiments. However, by minimizing the sum of pixel errors, the edges of the images may become very smooth and thereby possibly reducing the realism of the resulting images.

Therefore, to help make the refined synthetic images 430 more realistic, an adversarial cost term 450 may be added to the overall objective, according to some embodiments. For example, in one embodiments, a generative network $G_\theta$, such as generator 120, and a discriminative network $D_\phi$, such as discriminator 130, may both be learned. The generative network may adjust refiner parameters such that the discriminative network may not be able to tell the generated (e.g., refined synthetic) images from the real images, according to some embodiments. At the same time, the discriminative network may adjust discriminator parameters to better tell the images apart (e.g., the real from the refined synthetic).

Because there may be labels for real images and therefore corresponding pairs of synthetic and real images, the image difference between the refined synthetic image and corresponding real image may be minimized. Thus, while updating the generative network (e.g., the refiner network) parameters θ, the weighted combination of a GAN cost and the $l_1$ norm of the image difference may be minimized. For instance, the discriminative network (e.g., the adversarial network) may, in some embodiments, update its parameters by minimizing the following GAN cost per image pair, as shown in equation 1:

$$L_D^i(\phi) = -\log(1 - D_\phi(y_i)) - \log(D_\phi(\tilde{x}_i)).$$

This may in some embodiments be considered equivalent to cross-entropy error for the two-class classification problem when $D_\phi(.)$ is the probability of the input being a synthetic image, and $1 - D_\phi(.)$ is a real image, according to one embodiment. For instance, in one embodiment, $D_\phi$ may be implemented as a ConvNet whose last layer is a softmax function over two features.

Figure 5:
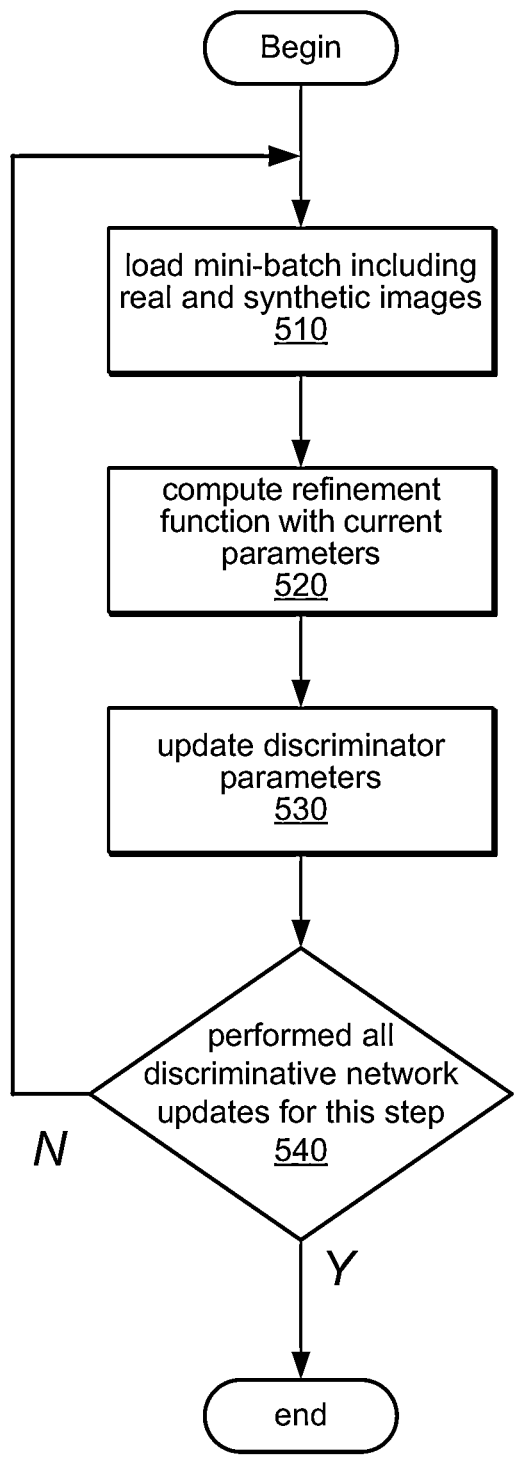
FIG. 5 is a flowchart illustrating one embodiment of a method for training a discriminative network, according to one embodiment.

FIG. 5 is a flowchart illustrating one embodiment of a method for training a discriminative network. The method illustrated in FIG. 5 represents, according to one example, embodiment, the discriminative network update steps for a single step in training the overall system. As shown in block 510, a mini-batch of images including both real and synthetic may be loaded. In some embodiments, each mini-batch (of data) may include half real images $y_i$'s and half refined synthetic images $\tilde{x}_i$'s. The target labels for the cross-entropy loss layer may be 0 for every $y_i$, and 1 for every $\tilde{x}_i$. The total loss for a mini-batch may, in some embodiments, be computed as the average of $L_D^i$ over the mini-batch. After computing the current generative function $G_\theta$ as in block 520, the discriminative parameters may be updated as in block 530. For instance, in one embodiment, φ for a mini-batch may be updated by taking a stochastic gradient descent (SGD) step on this average mini-batch loss, according to some embodiments. The method of FIG. 5 may repeat until all the discriminative network updates for this currently step have been performed, as in decision block 540.

Figure 6:
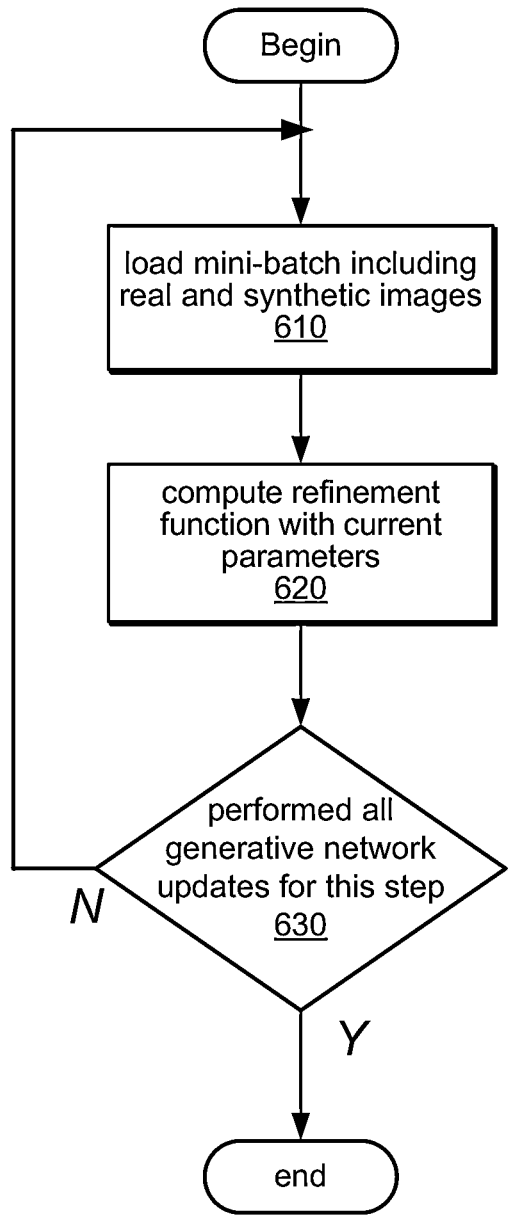
FIG. 6 is a flowchart illustrating one embodiment of a method for training a generative network, according to one embodiment.

Similarly, FIG. 6 is a flowchart illustrating one embodiment of a method for training a discriminative network. The method illustrated in FIG. 6 represents, according to one example, embodiment, the discriminative network update steps for a single step in training the overall system. As shown in block 610, a mini-batch of images including both real and synthetic may be loaded. As noted above, in some embodiments, each mini-batch (of data) may include half real images $y_i$'s and half refined synthetic images $\tilde{x}_i$'s. The target labels for the cross-entropy loss layer may be 0 for every $y_i$, and 1 for every $\tilde{x}_i$. The discriminative parameters may be updated as in block 620. For instance, in one embodiment, φ for a mini-batch may be updated by taking a stochastic gradient descent (SGD) step on this average mini-batch loss, according to some embodiments. For instance, in one embodiment, the generative network's parameters may, be updated by minimizing the following cost per image, as shown in equation 2:

$$L_G^i(\theta) = -\log(1 - D_\phi(G_\theta(x_i))) + \lambda \|G_\theta(x_i) - y_i\|_1,$$

The method of FIG. 6 may repeat until all the discriminative network updates for this currently step have been performed, as in decision block 630.

In equation 2 above, according to one embodiment, $y_i$ is the real image corresponding to $x_i$, an $\|.\|_1$ is $l_1$ norm. $G_\theta$ may, in one embodiment, be implemented as a fully convolutional neural net without any stride or pooling. Additionally, each convolutional layer's input may be padded with zeros, such as to keep the input and the output image sizes the same. To compute the first part of the loss $L_G^i$, a mini-batch of synthetic images may be passed to $G_\theta$, and then its output may be passed to $D_\phi$. Thus, a mini-batch of synthetic data produced by synthesizer 110 may be refined by generator 120 using a refinement function, such as one based on example equation 2 above, and the refined synthetic data may be passed to discriminator 130.

The output of $D_\phi$ may in turn be passed to a cross-entropy loss layer with target labels set to 0 for each sample in the mini-batch, according to some embodiments. This process means that while updating the parameters θ, an attempt is made to make each image look real (or at least more real than the original version of the image), in the sense that the predicted label of $G_\theta(x_i)$ when passed through $D_\phi$ is 0. In some embodiments, the total loss for a mini-batch, while updating θ, may be computed by adding cross-entropy loss and the weighted image difference loss, and then taking the average over the mini-batch. The training procedure may be summarized as in Algorithm 1, below.

Algorithm 1: Training of synthetic image refiner network $G_\theta$
    Input: Pairs of synthetic and real images $\{x_i, y_i\}_{i=0}^N$, mini-batch size (n), max number of steps (T), number of discriminative network updates per step ($K_d$), number of generative network updates per step ($K_g$).
    Output: ConvNet model $G_\theta$.
    for t=1, . . . , T do
        for k=1, . . . , $K_d$ do
            1. Load a mini-batch of real images $y_i$ and synthetic images $x_i$, where i=1, . . . , n.
            2. Compute $\tilde{x}_i = G_\theta(x_i)$ with current θ.
            3. Update φ by taking a SGD step w.r.t. φ on $$\text{mini-batch loss} = \frac{1}{2n}\sum_i L_D^i(\phi).$$

end
        for k=1, . . . , $K_g$ do
            1. Load a mini-batch of real images $y_i$ and synthetic images $x_i$, where i=1, . . . , n. Update θ by taking a SGD step w.r.t. θ on $$\text{mini-batch loss} = \frac{1}{n}\sum_i L_G^i(\theta).$$

end
    end

Figure 7:
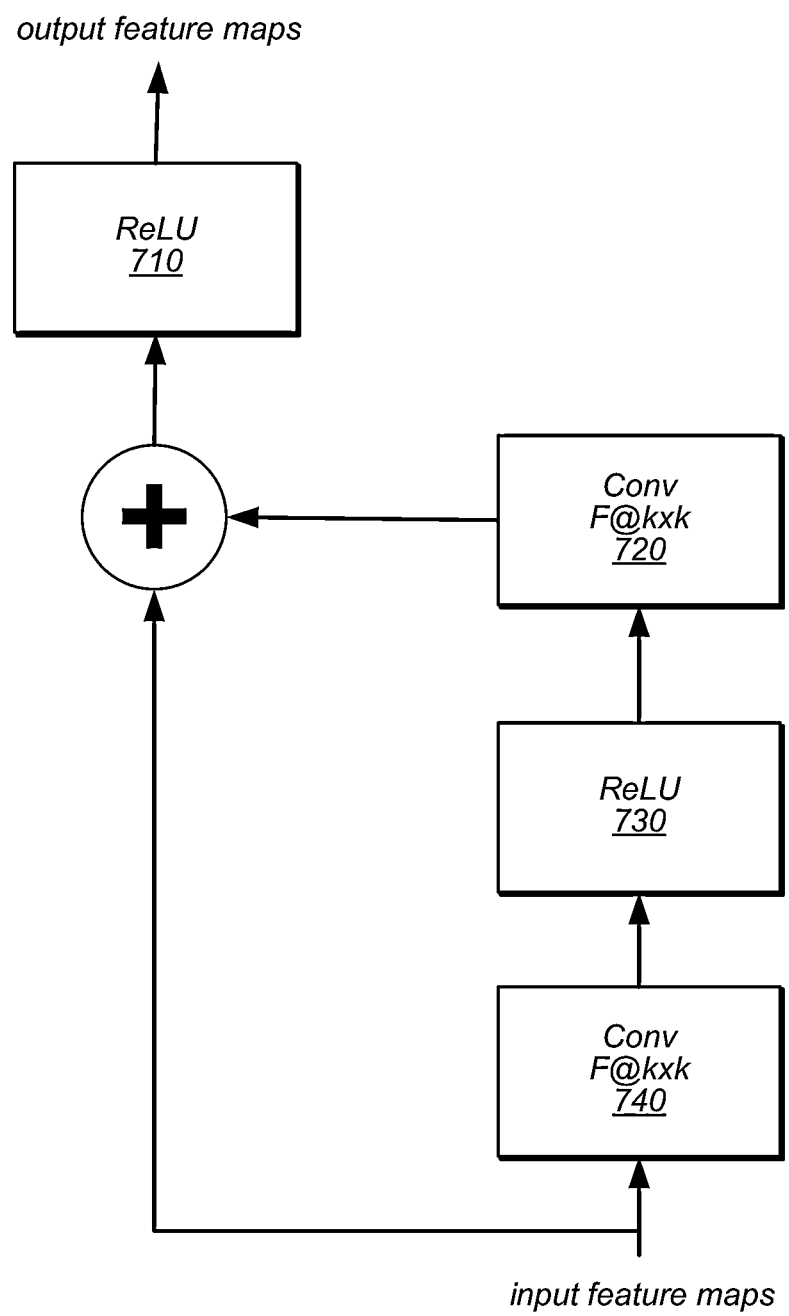
FIG. 7 is a logical block diagram illustrating a residual network block with two convolution layers, according to one embodiment.

In some embodiments, a residual network (ResNet) may be used to model the Refiner ConvNet $G_\theta$. FIG. 7 is a block diagram illustrating a residual network block, according to one embodiment. For example, each ResNet block may consist of two convolutional layers 720 and 740 and two rectified linear units (ReLu) 710 and 730. Each convolution layer may include 64 feature maps. For instance, an input image of size 224×224 may be convolved with 7×7 filters that output 64 feature maps, according to one embodiment. The output may be passed through multiple such ResNet blocks (10 in one example embodiment). The output of the last ResNet block may be passed to a 1×1 convolutional layer producing 1 feature map corresponding to the refined synthetic image. Batch normalization may be used for each layer of $G_\theta$ (except the last layer), in some embodiments.

According to one example, embodiment, a discriminative net D$\phi$, such as may be part of discriminator 130, may contain 3 convolutional layers and 3 fully connected layers as follows: (1) Conv7×7, stride=4, feature maps=96, (2) Conv5×5, stride=2, feature maps=64, (3) MaxPool3×3, stride=2, (4) Conv3×3, stride=2, feature maps=32, (5) Conv1×1, stride=1, feature maps=32, (6) Conv1×1, stride=1, feature maps=2, (7) Softmax.

The adversarial network described herein may be a fully convolutional neural network, and it may be configured such that the receptive field of the last layer neurons in $G_\theta$ and D$\phi$ are similar. First, the techniques described herein may involve learning (e.g., configuring, training, etc.) the $G_\theta$ network with just the $l_1$ cost for 500 steps, and D$\phi$ for 200 steps. Then, for each update of D$\phi$, $G_\theta$ may be updated twice. For instance, in Algorithm 1 above, $K_d$ is set to 1, and $K_g$ is set to 2, according to one embodiment.

The various networks (e.g., neural networks, deep neural networks, convolution neural networks, residual networks, etc.) may be implemented in any of various manners, using any of various techniques, such as using a software library for numerical computation using data flow graphs, etc.

Figure 8:
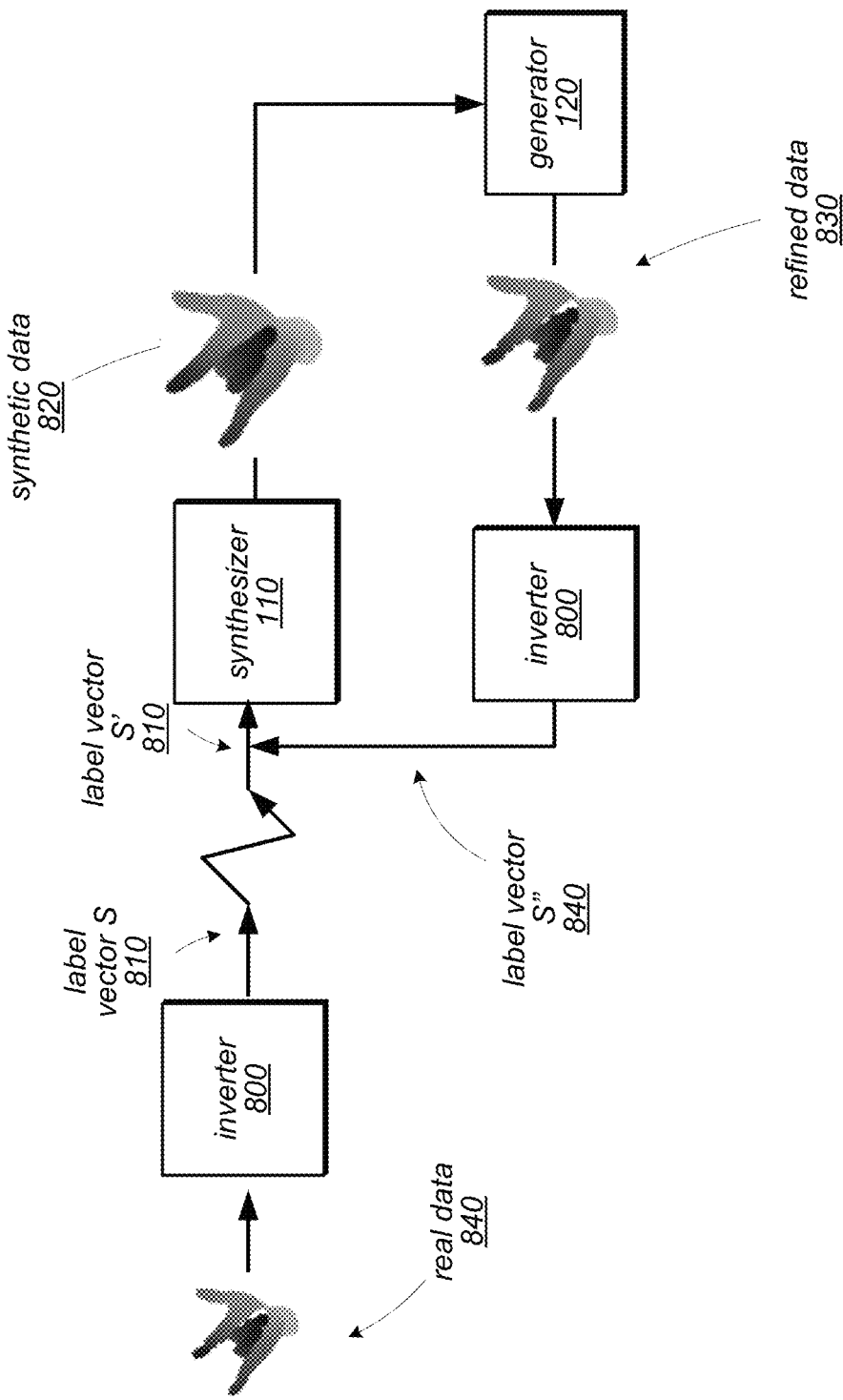
FIG. 8 is a logical block diagram illustrating a system configured to refine synthetic images where in the input may include a set of unlabeled real images, according to one embodiment.

FIG. 8 is a logical block diagram illustrating a system configured to refine synthetic images where in the input may include a set of unlabeled real images using breeder learning, according to one embodiment. In embodiments where the inputs may be a set of unlabeled real images together, synthesizer 110 may be configured to generate an image from an input label vector s 810. In some embodiments, an auxillary recognition network R$\psi$ may predict the label vector s of real image. Given this label vector, synthesizer 110 may generate a corresponding synthetic image 820 that may then be refined as in the labeled approach described above, according to one embodiment.

Thus, in some embodiments, the system may be configured to generate synthetic images that may be closer to the real data distribution, the system may first predict the label vector of a real image and may then create the synthetic image corresponding to the predicted label, such as by feeding the predicted label to synthesizer 110. This may result in pairs of corresponding real and synthetic images which can be used to train the refiner network. In some embodiments, this may utilize a goal of learning a recognition model R$\psi$ (e.g., the inverter network 800) that may be configured to invert the 'black box' synthesizer 110 plus $G_\theta$. The output of R$\psi$ may be used as an input to synthesizer 110 whose output can, in turn, be refined using $G_\theta$.

The labels of a real image 840 may help generate a corresponding synthetic image 820 that looks very similar to a corresponding real image (e.g., in terms of position, shape, appearance, etc.). As used herein the term 'label' refers to one or more key attributes describing the synthesized data and used by the simulator to synthesize data, such as an image of an object. In some embodiments, a correspondence between the real and synthetic images may be needed while computing the image difference in equation 2, above. Thus, in some embodiments, a self-regulator term may be added to keep the refiner network from drifting too far from the original synthetic image, as noted above. If the refiner network drifts too far, the annotations may no longer represent the refined image (e.g., if the refiner network modifies an image so much that it represents a different hand pose, body pose, etc.). With unlabeled real images, however, the synthetic images 820 may not have a corresponding real image 840 for computing the image difference.

In this case the difference 860 between the refined synthetic image 830 and the original synthetic image 820 may be regularized. Hence, in some embodiments, the generative cost term $L_G^i$ may reduce to equation 3:

$$L_G^i(B) = -\log(1 - D_\phi(G_\theta(x_i))) + \lambda \|G_\theta(x_i) - x_i\|_1.$$

In some embodiments, inverter network 800 may be learned using Breeder learning. For instance, in one embodiment inverter network 800 may be initialized such that it outputs the label vector of one real image (e.g., whose labels are provided). For example, the biases of the last layer may be set equal to the ground truth labels of this single image. The output of R$\psi$, label vectors 810, may be defined as $s_i = R\psi(y_i)$ for the $i^{th}$ real image. $S_i$ may be perturbed slightly (e.g., to explore the label space) into $s_i'$. which may be used to generate a synthetic image $x_i' = BB(s_i')$ by synthesizer 110. The synthetic image $x_i'$ may then be refined using $G_\theta$, outputting $x_i' = G_\theta(x_i')$. This synthetic image 820 may be used to generate another label vector with R$\psi$, outputting $s_i'' = R\psi(x_i')$, label vector s'' 840 in FIG. 8. Additionally, $\psi$ may be updated by minimizing the different between $s_i'$ and $s_i''$. The per example cost for learning R$\psi$ may then be calculated by equation 4:

$$L_H^i(\psi) = \|si' - R_\psi(x_i')\|_2$$

The training procedure may be summarized as in Algorithm 2, below.

Algorithm 2: Breeder learning with a given refiner network $G_\theta$

Input: A set of real images $\{y_i\}_{i=0}^N$, mini-batch size (n), max number of steps (T), image synthesizer (BB), refiner ConvNet ($G_\theta$), at least one labeled example.
   Output: ConvNet model $R_\psi$.
   Initialize $R_\psi$ with small number of labeled real images.
   for t=1, . . . , T do
      1. Load a real image $y_i$.
      2. Compute $s_i = R\psi(y_i)$.
      3. Perturb $s_i$ to $s_i'$.
      4. Synthesize an image using $s_i'$, i.e., $x_i' = BB(s_i')$.
      5. Refine synthetic image: $x_i' = G_\theta(x_i')$.
      6. Compute $s_i'' = H_\psi(x_i')$
      7. Update $\psi$ by taking a SGD step w.r.t. $\psi$ to minimize $\|s_i' - s_i''\|$
   end With appropriate initialization of $\theta$ and $\psi$, Algorithms 1 and 2 may be alternated to learn image refine network $G_\theta$ and a recognition network R$\psi$, according to some embodiments.

While described herein mainly in terms of real images (or other real data) that correspond to 'real' (e.g., refined) versions of the synthetic images, in some embodiments, the real data that is used in an adversarial net refinement process (e.g., developed according to the systems, methods and/or techniques described herein) may not have to include actual examples of the objects (e.g., or other data types) that are trying to be learned. Instead, in some embodiments, the adversarial net refinement process may only need to have similar real data that can provide refinement information. For instance, while training for particular objects (e.g., hand, eye, car, etc.) the adversarial net refinement process may not need data representing exactly that object (e.g., exactly that hand, eye, car, etc.), but instead may utilize data representing many different variations on that object (e.g., many different hands, eyes, cars, etc.). Therefore, when a new synthetic image is used, even though the system hasn't seen exactly that object, it can still learn to make a more realistic version of it, according to some embodiments.

Figure 10:
FIG. 10 illustrates, according to one embodiment, real image samples from a hand pose dataset.

The systems, methods and/or techniques described herein may be evaluated, according to some embodiments, by learning a model with a set of real and synthetic images without any correspondence (i.e., no labels for the real images). FIG. 10 illustrates, according to one embodiment, real image samples from a hand pose dataset. Using Algorithm 1, described above, with $L_G^i(\theta)$ in equation 3, also described above, the refiner network of generator 120 may be learned, according to one example embodiment.

Figure 11:
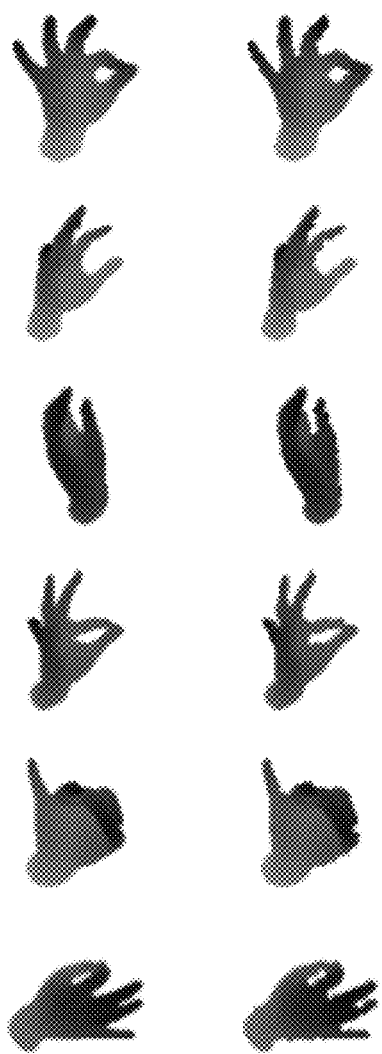
FIG. 11 illustrates, according to one embodiment, qualitative results of applying the techniques described herein on an example hand pose dataset.

FIG. 11 illustrates, according to one embodiment, qualitative results of applying the techniques described herein on an example hand pose dataset. Overall the results illustrated in FIG. 11 illustrate, according to one embodiment, a clear improvement (e.g., fewer artifacts in the texture of the hand) from adding GAN. Additionally, the final output may appear visually significantly closer to the distribution of the real images than the original synthetic image, according to one example embodiment.

Figure 12:
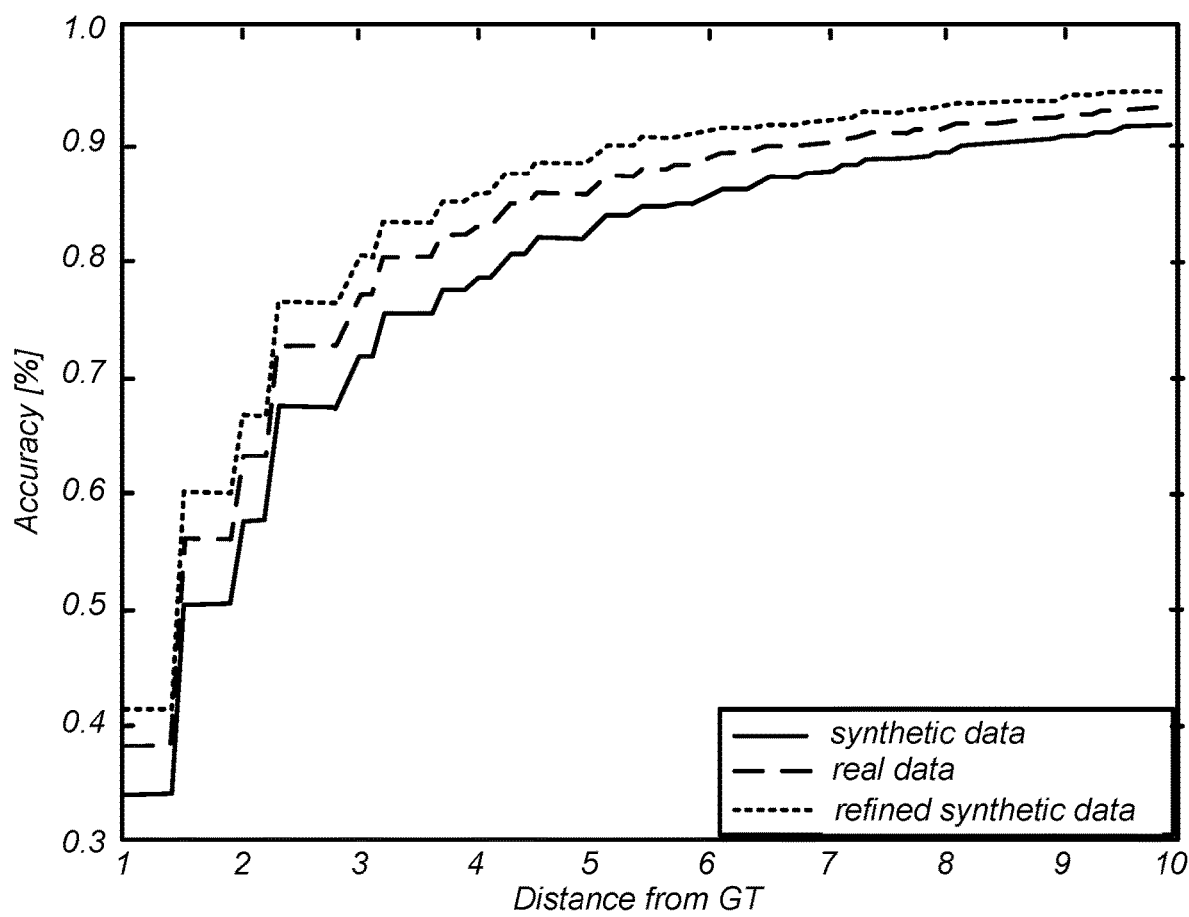
FIG. 12 is a chart illustrating quantitative results, according to one embodiment, of applying the techniques described herein on hand pose test set.

FIG. 12 is a chart illustrating quantitative results, according to one embodiment, of applying the techniques described herein on hand pose test set. In some embodiments, the refiner generative model, described herein, may be able to close about 70% of the synthetic gap in a completely unsupervised manner (e.g., without requiring any labels for the real images). A hand pose estimator (e.g., such as a stacked hourglass network or other convolutional network) may be trained (e.g., configured, learned, etc.) on real, synthetic, and refined synthetic images of the hand pose training set, and each model may be evaluated on real images in the hand pose test dataset. As shown, the methods, systems and/or techniques described herein may be able to close most of the synthetic gap. In some embodiments, the methods, systems and/or techniques described herein may be able to close most of the synthetic gap without requiring any correspondences (i.e., without labels for the real images).

Figure 13:
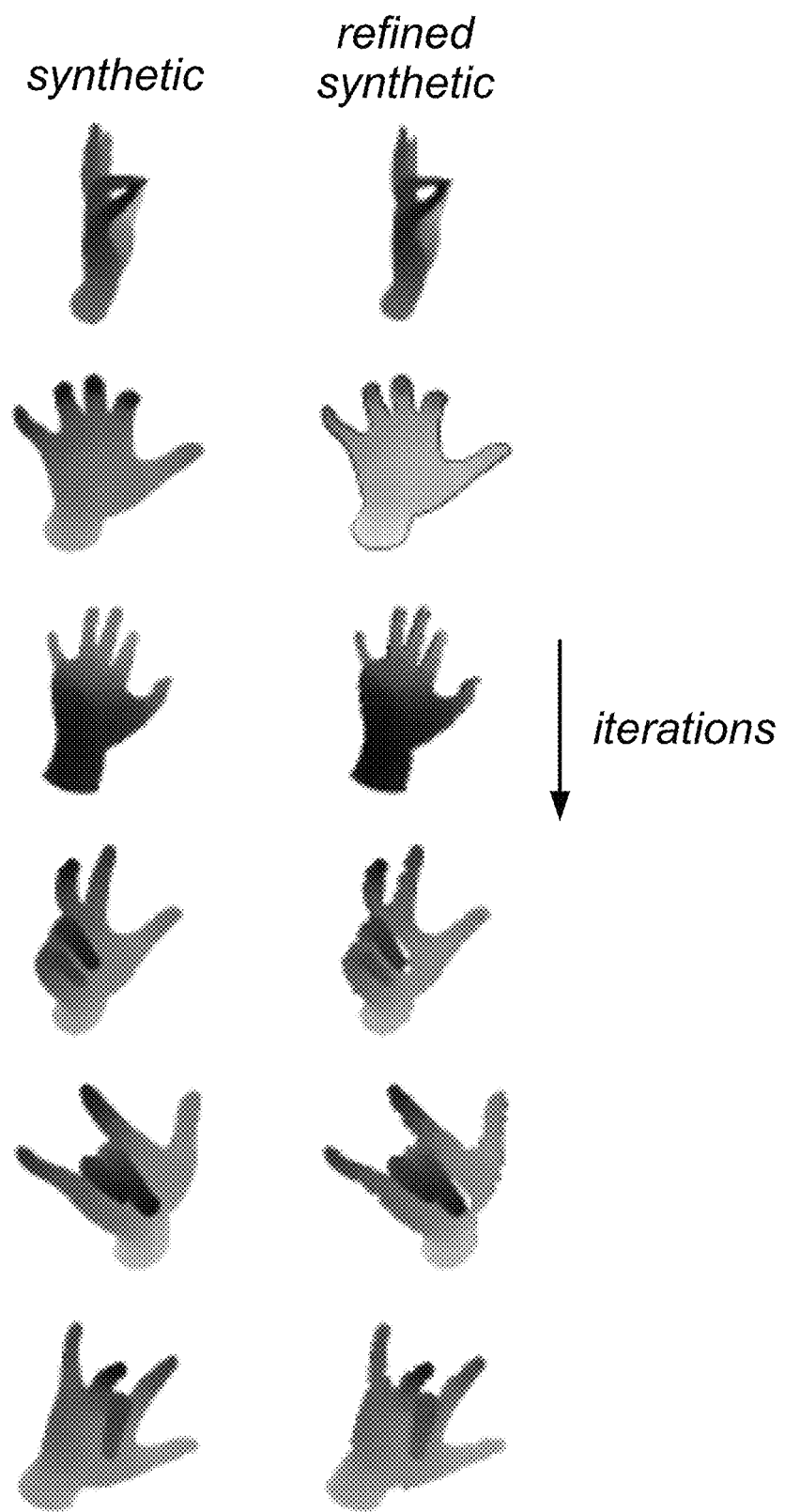
FIG. 13 illustrates, according to one embodiment, qualitative results as training progresses of applying the technique described herein on an example hand pose dataset.

FIG. 13 illustrates one example of qualitative results as training progresses and visualizes the intermediate results of GAN training with increasing iterations of training (e.g., following network initialization with $l_1$-only training). The right column shows refined synthetic images (e.g., images refined according to the methods, systems and/or techniques described herein) with the trained model at different iterations, according to one example embodiment. At the beginning of the training, GAN may introduce different kinds of artifacts (i.e., which may fool the adversarial network). It may take multiple (e.g., a few) iterations of alternating (e.g., dueling) between the generative and adversarial networks before the generative network may start to model the right kind of noise (e.g., the kind of noise that allows the refined images to appear 'more real'). In FIG. 13, rows correspond to the iterations as the training progresses, according to one example embodiment. The top row is the result of just the $l_1$ image difference based training for 300 steps, and the later rows show the result when trained on top of this model. In the beginning, the GAN part of the cost may introduce different kinds of noise (e.g., in trying to beat the adversarial network $D\phi$). As the processing between $G_\theta$ and $D\phi$ continues, $G_\theta$ may learn to model the right kind of noise, according to some embodiments.

Figure 14:
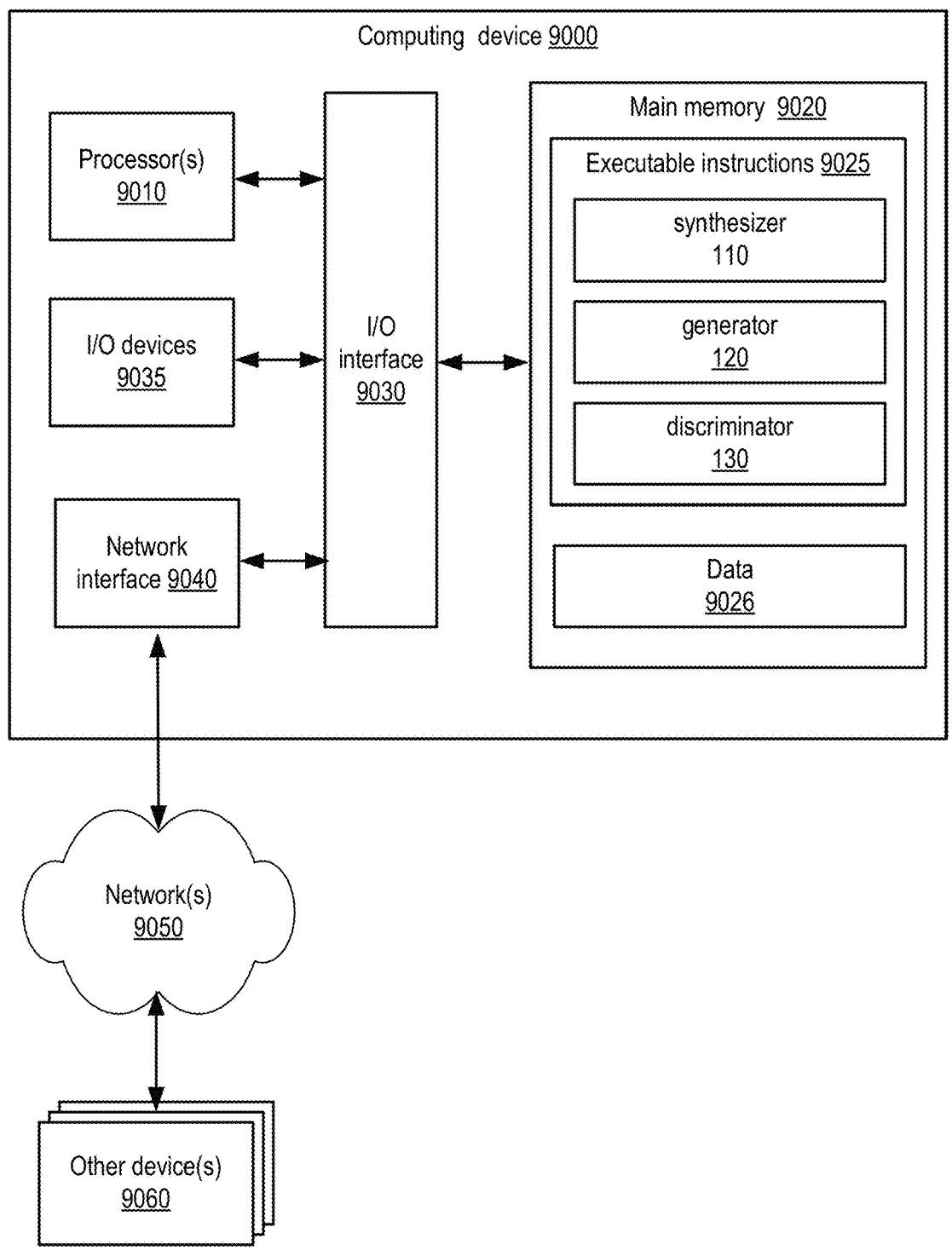
FIG. 14 is a logical block diagram illustrating one embodiment of a system configured to implement the methods and/or techniques described herein.

In at least some embodiments, a system and/or server that implements a portion or all of one or more of the methods and/or techniques described herein, including the techniques to refine synthetic images, to train and execute machine learning algorithms including neural network algorithms, and the like, may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 9026 implementing one or more desired functions, such as those methods, techniques, and data described above, are shown stored within main memory 9020. For example, in some embodiments, main memory 9020, executable program instructions 9025, and/or data 9026 may include (and/or implement) synthesizer 110, generator 120 and/or discriminator 130.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

The various methods and/or techniques as illustrated in the figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer implemented method, comprising:
   receiving, by a generator module, synthetic data, wherein the synthetic data approximates corresponding real data;
   modifying the synthetic data to produce refined synthetic data, wherein the synthetic data is modified according to a refiner neural network and based at least in part on a refinement function, wherein the refinement function takes one or more refinement parameters at input;
   classifying, by a discriminator module, the refined synthetic data as either synthetic or real according to a discriminator neural network and based in part on one or more discriminator parameters; and
   adjusting at least one of the one or more refinement parameters based on said classifying, wherein after said adjusting, synthetic data modified according to the refiner neural network is more likely to be classified as real than synthetic data adjusted prior to said adjusting.

2. The method of claim 1, wherein said adjusting comprises applying an adversarial cost value to the refinement function, wherein the adversarial cost value is based at least in part on said classifying.

3. The method of claim 1, wherein said adjusting comprises applying a self-regularization term to the refinement function, wherein the self-regularization term comprises a difference value based on a comparison between the synthetic data and refined synthetic data.

4. The method of claim 1, further comprising training the refiner neural network, wherein said training comprises repeating said receiving, said modifying, said classifying and said adjusting.

5. The method of claim 4, wherein said training comprises repeating said receiving, said modifying, said classifying and said adjusting until the discriminator module classifies the refined synthetic data as real.

6. The method of claim 1, further comprising applying the refined synthetic data as training input to a machine learning system, wherein the machine learning system performs better when trained using the refined synthetic data than when trained using the unrefined synthetic data.

7. The method of claim 1, further comprising generating, by a synthesizer module, the synthetic data based on one or more key attributes describing the synthesized data.

8. A system, comprising one or more processors and a memory coupled to the processors, wherein the memory comprises program instructions configured to implement:
a generator module; and
a discriminator module;
wherein the generator module is configured to:
receive synthetic data that approximates real data;
modify the synthetic data to produce refined synthetic data, wherein the synthetic data is modified according to a refiner neural network and based at least in part on a refinement function, wherein the refinement function takes one or more refinement parameters at input;
wherein the discriminator module is configured to:
classify the refined synthetic data as either synthetic or real according to a discriminator neural network and based in part on one or more discriminator parameters; and
wherein the generator module is further configured to:
adjust at least one of the one or more refinement parameters based on said classifying, wherein after said adjusting, synthetic data modified according to the refiner neural network is more likely to be classified as real than synthetic.

9. The system of claim 8, wherein to adjust the at least one of the one or more refinement parameters, the generator module is further configured to apply an adversarial cost value to the refinement function, wherein the adversarial cost value is based at least in part on said classifying of the refined synthetic data.

10. The system of claim 8, wherein to adjust the at least one of the one or more refinement parameters, the generator module is further configured to apply a self-regularization term to the refinement function, wherein the self-regularization term comprises a difference value based on a comparison between the synthetic data and refined synthetic data.

11. The system of claim 8, wherein the generator module is further configured to repeat said receiving, said modifying, said classifying and said adjusting.

12. The system of claim 11, wherein the generator module is further configured to repeat said receiving, said modifying, said classifying and said adjusting until the discriminator module classifies the refined synthetic data as real.

13. The system of claim 8, wherein the program instructions are further configured to implement a synthesizer module configured to generate the synthetic data based on one or more key attributes describing the synthesized data.

14. A non-transitory, computer-readable storage medium storing program instructions that when executed on one or more computers cause the one or more computers to perform:
receiving, by a generator module, synthetic data, wherein the synthetic data approximates corresponding real data;
modifying the synthetic data to produce refined synthetic data, wherein the synthetic data is modified according to a refiner neural network and based at least in part on a refinement function, wherein the refinement function takes one or more refinement parameters at input;
classifying, by a discriminator module, the refined synthetic data as either synthetic or real according to a discriminator neural network and based in part on one or more discriminator parameters; and
adjusting at least one of the one or more refinement parameters based on said classifying, wherein after said adjusting, synthetic data modified according to the refiner neural network is more likely to be classified as real than synthetic data adjusted prior to said adjusting.

15. The non-transitory, computer-readable storage medium of claim 14, wherein said adjusting comprises applying an adversarial cost value to the refinement function, wherein the adversarial cost value is based at least in part on said classifying.

16. The non-transitory, computer-readable storage medium of claim 14, wherein said adjusting comprises applying a self-regularization term to the refinement function, wherein the self-regularization term comprises a difference value based on a comparison between the synthetic data and refined synthetic data.

17. The non-transitory, computer-readable storage medium of claim 14, wherein the program instructions further cause the one or more computers to perform: training the refiner neural network, wherein said training comprises repeating said receiving, said modifying, said classifying and said adjusting.

18. The non-transitory, computer-readable storage medium of claim 17, wherein said training comprises repeating said receiving, said modifying, said classifying and said adjusting until the discriminator module classifies the refined synthetic data as real.

19. The non-transitory, computer-readable storage medium of claim 14, wherein the program instructions further cause the one or more computers to perform: applying the refined synthetic data as training input to a machine learning system, wherein the machine learning system performs better when trained using the refined synthetic data than when trained using the unrefined synthetic data.

20. The non-transitory, computer-readable storage medium of claim 14, wherein the program instructions further cause the one or more computers to perform: generating, by a synthesizer module, the synthetic data based on one or more key attributes describing the synthesized data.

* * * * *